United States Patent
Klimek (10) Patent No.: US 11,209,311 B2
(45) Date of Patent: Dec. 28, 2021

(54) MULTISPECTRAL FILTER

(71) Applicant: VIAVI Solutions Inc., San Jose, CA (US)

(72) Inventor: Michael Klimek, Santa Rosa, CA (US)

(73) Assignee: VIAVI Solutions Inc., San Jose, CA (US)

(*) Notice: Subject to any disclaimer, the term of this patent is extended or adjusted under 35 U.S.C. 154(b) by 0 days.

(21) Appl. No.: 16/822,929

(22) Filed: Mar. 18, 2020

(65) Prior Publication Data

US 2021/0293622 A1 Sep. 23, 2021

(51) Int. Cl.
  *G01J 3/28* (2006.01)
  *G01J 3/02* (2006.01)

(52) U.S. Cl.
  CPC ........... *G01J 3/2823* (2013.01); *G01J 3/0294* (2013.01); *G01J 3/2803* (2013.01); *G01J 2003/2826* (2013.01)

(58) Field of Classification Search
  CPC ...... G01J 3/2823; G01J 3/0294; G01J 3/2803; G01J 2003/2826
  See application file for complete search history.

(56) References Cited

U.S. PATENT DOCUMENTS

| | | | |
|---|---|---|---|
| 2008/0144177 A1* | 6/2008 | Miller | G01J 3/32 359/489.07 |
| 2014/0293091 A1 | 10/2014 | Rhoads et al. | |
| 2015/0288894 A1 | 10/2015 | Geelen et al. | |
| 2016/0241797 A1* | 8/2016 | Ye | H04N 9/0455 |
| 2016/0245698 A1 | 8/2016 | Pau et al. | |
| 2018/0184015 A1* | 6/2018 | Richarte | H04N 5/2355 |
| 2018/0238735 A1 | 8/2018 | Rosen et al. | |
| 2019/0346307 A1 | 11/2019 | Genier et al. | |

OTHER PUBLICATIONS

Extended European Search Report for Application No. 21160689.2, dated Aug. 17, 2021, 10 pages.

* cited by examiner

*Primary Examiner* — Hina F Ayub
(74) *Attorney, Agent, or Firm* — Harrity & Harrity, LLP (57) ABSTRACT

An optical device may comprise an array of sensor elements that includes a plurality of pixels and a multispectral filter disposed on the array of sensor elements. The multispectral filter may be configured to pass a first transmission percentage of light of a particular spectral range to a first set of pixels of the plurality of pixels and pass a second transmission percentage of light of the particular spectral range to a second set of pixels of the plurality of pixels.

20 Claims, 4 Drawing Sheets

FIG. 4

MULTISPECTRAL FILTER

BACKGROUND

A multispectral sensor device may be utilized to capture information. For example, the multispectral sensor device may capture information relating to a set of electromagnetic frequencies. The multispectral sensor device may include a set of sensor elements (e.g., optical sensors, spectral sensors, and/or image sensors) that capture the information. For example, an array of sensor elements may be utilized to capture information relating to multiple frequencies.

SUMMARY

According to some implementations, an optical device comprises an array of sensor elements that includes a plurality of pixels and a multispectral filter disposed on the array of sensor elements, configured to pass a first transmission percentage of light of a particular spectral range to a first set of pixels of the plurality of pixels and pass a second transmission percentage of light of the particular spectral range to a second set of pixels of the plurality of pixels.

According to some implementations, a system comprises an array of sensor elements and a multispectral filter comprising a plurality of optical channels that is disposed on at least a portion of the array of sensor elements, the multispectral filter configured to pass a first transmission percentage of bandpass filtered light associated with a particular spectral range to the array of sensor elements and pass a second transmission percentage of bandpass filtered light associated with the particular spectral range to the array of sensor elements.

According to some implementations, a multispectral filter comprises a plurality of optical channels, wherein one or more optical channels, of the plurality of optical channels, are configured to pass a first transmission percentage of light associated with a particular spectral range to a first set of pixels of a multispectral sensor device and pass a second transmission percentage of light associated with the particular spectral range to a second set of pixels of a multispectral sensor device.

DETAILED DESCRIPTION

The following detailed description of example implementations refers to the accompanying drawings. The same reference numbers in different drawings may identify the same or similar elements.

An optical filter (e.g., a multispectral filter) may include a set of optical channels designed to transmit light in different spectral ranges (e.g., wavelength ranges). For example, the set of optical channels may include discrete gratings or bandpass filters, each of which may be designed to pass light in a respective spectral range. The optical filter may be included in an optical device, such as a multispectral sensor device, that includes a set of sensor elements (e.g., optical sensors) to capture spectral data relating to different wavelengths of light (based on wavelengths of light passed by the optical filter) related to a target object (e.g., that emits and/or reflects light to the optical device).

In many cases, each optical channel of the set of optical channels of the optical filter may be configured to pass bandpass filtered light (e.g., light of a particular spectral range, such as light that may have a spectral width of 10-100 nanometers) to a respective set of pixels associated with the set of sensor elements of the multispectral sensor device. However, the set of sensor elements may be more sensitive to some spectral ranges than others, more light associated with one spectral range may pass to the set of sensor elements than light associated with another spectral range, and/or the like, which may cause the set of sensor elements to obtain too much data relating to some spectral ranges (e.g., be overexposed to light) and not enough data related to other spectral ranges (e.g., be underexposed to light) during a particular integration time.

In some cases, the set of sensor elements may be configured to capture multiple "frames" that are respectively associated with different integration times, so that an optimal amount of data may be obtained for each spectral range associated with the set of optical channels. The multiple frames can be processed (e.g., using complex mathematical algorithms) to create a single frame with a high dynamic range (HDR) that indicates representative data associated with each spectral range. However, this may involve a use of computing resources (e.g., processing resources, memory resources, power resources, and/or the like) of a device to create the HDR frame. Moreover, taking additional time to capture multiple frames and/or to combine the multiple frames may cause an inaccurate and/or outdated HDR frame to be created.

Some implementations described herein provide an optical filter (e.g., a multispectral filter) that can pass different transmission percentages of light associated with different spectral ranges to an array of sensor elements. For example, in some implementations, a first optical channel of the optical filter may pass a first transmission percentage (e.g., 100% or near 100%) of light associated with a particular spectral range to the array of sensor elements, and a second optical channel of the optical filter may pass a second transmission percentage (e.g., 65%) of light associated with the particular spectral range (e.g., the same particular spectral range associated with the first optical channel) to the array of sensor elements. As another example, in some implementations, a first optical channel section of an optical channel of the optical filter may pass a first transmission percentage (e.g., 15%) of light associated with a particular spectral range to the array of sensor elements, and a second optical channel section of the optical channel of the optical filter may pass a second transmission percentage (e.g., 57%) of light associated with the particular spectral range (e.g., the same particular spectral range associated with the first optical channel section) to the array of sensor elements.

In this way, some implementations described herein allow different amounts of light associated with one or more respective spectral ranges to pass to the multispectral sensor, increasing a likelihood that the multispectral sensor can capture an optimal amount of light for each spectral range in a single frame (e.g., during a particular integration time). This single frame may have as much or more information as an HDR frame composed of multiple frames described above. Accordingly, computing resources do not need to be used to obtain the single frame that would otherwise be used to create the HDR frame. Moreover, the single frame may be more accurate than an HDR frame because the single frame is associated with light captured during a single integration time, rather than multiple integration times. This may also enable the optical filter to support time-sensitive applications.

Figure 1:
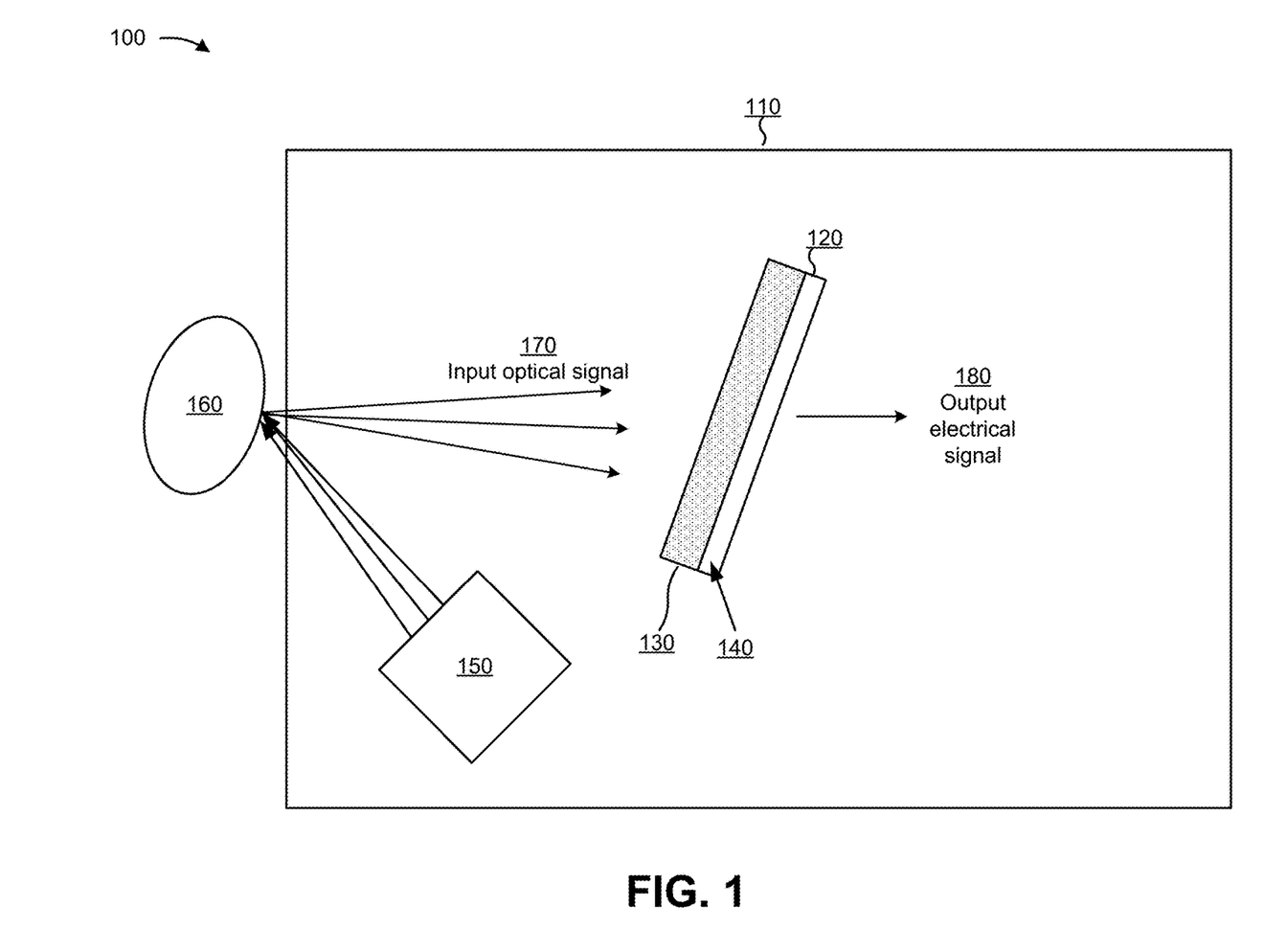
FIG. 1 is a diagram of an example sensor system described herein.

FIG. 1 is a diagram of an example implementation 100 described herein. As shown in FIG. 1, example implementation 100 includes a sensor system 110. Sensor system 110 may be a portion of an optical system (e.g., an optical device), and may provide an electrical output corresponding to a sensor determination. For example, sensor system 110 may be a portion of a biometric system, a security system, a health monitoring system, an object identification system, a spectroscopic identification system, an imaging system, and/or the like. Sensor system 110 includes an optical filter structure 120, which includes an optical filter 130, and an array of sensor elements 140 (e.g., a set of optical sensors). For example, optical filter structure 120 may include an optical filter 130 that includes one or more optical channels, where a set of the optical channels is configured to pass multiple different transmission percentages of light associated with a particular spectral range to respective sets of pixels of the array of sensor elements 140.

In some implementations, optical filter 130 may be a multispectral filter (e.g., that includes an array of optical channels), such as a multispectral filter coupled to a multispectral sensor (e.g., the array of sensor elements 140). The optical filter 130 may be coextensive with the array of sensor elements 140 (e.g., a face of the optical filter 130 may be aligned with a face of the array of sensor elements 140) or may be coextensive with a portion of the array of sensor elements 140 (e.g., a face of the optical filter 130 may be aligned with a portion of the array of sensor elements 140). In some implementations, the array of sensor elements 140 may include a plurality of pixels (e.g., a particular number of pixels may be included in each sensor element of the array of sensor elements).

Sensor system 110 may include an optical transmitter 150 (e.g., a light source) that transmits an optical signal toward a target 160 (e.g., a person, a finger of the person, an object, and/or the like). The optical signal may include broadband light emitted by the optical transmitter 150 and/or ambient light from the environment in which sensor system 110 is being utilized. In some implementations, sensor system 110 may perform sensing without using an optical transmitter 150 to transmit an optical signal toward a target 160. As shown by reference number 170, the optical signal is directed toward the optical filter structure 120. For example, optical transmitter 150 may direct an optical signal that comprises multiple wavelength ranges of visible light, near-infrared light, mid-infrared light, ultraviolet light, and/or the like toward an object (e.g., the target 160) and the optical signal may be reflected off the object toward the optical filter structure 120 to permit at least one sensor element of the array of sensor elements 140 to perform a measurement of light associated with a particular spectral range of the optical signal. Additionally, or alternatively, the optical signal may include light emitted by the object or other light from the environment. In some implementations, at least a portion of the optical signal is passed by the optical filter 130 to the array of sensor elements 140.

As further shown in FIG. 1, and by reference number 180, based on the at least a portion of the optical signal being passed to the array of sensor elements 140, the array of sensor elements 140 may provide an output electrical signal (e.g., a digital electrical signal, an analog electrical signal, and/or the like) for sensor system 110, such as for use in performing a multispectral measurement, recognizing a gesture of the user, detecting the presence of an object, and/or the like.

As indicated above, FIG. 1 is provided merely as an example. Other examples may differ from what is described with regard to FIG. 1.

Figure 2:
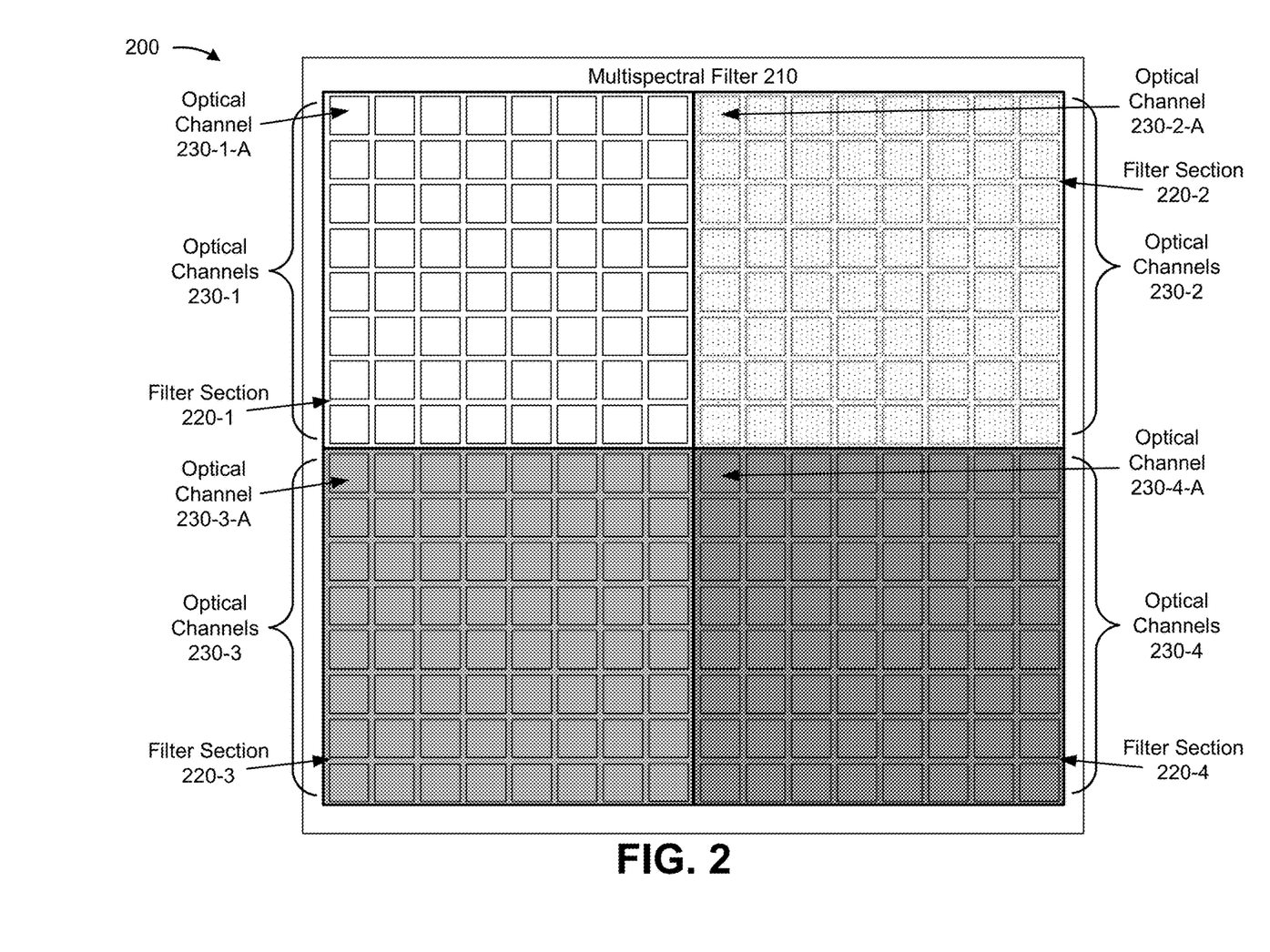
FIGS. 2-4 are diagrams of one or more example implementations described herein.

FIG. 2 is a diagram of an example implementation 200 described herein. As shown in FIG. 2, example implementation 200 includes a multispectral filter 210. The multispectral filter 210 may be divided into a plurality of filter sections 220. As shown in FIG. 2, the multispectral filter 210 may include filter sections 220-1 through 220-4, but contemplated implementations include any number of filter sections. Each filter section, of the plurality of filter sections 220, may include one or more optical channels 230. As shown in FIG. 2, the filter section 220-1 includes 64 optical channels 230-1, the filter section 220-2 includes 64 optical channels 230-2, the filter section 220-3 includes 64 optical channels 230-3, and the filter section 220-4 includes 64 optical channels 230-4, but contemplated implementations include any number of optical channels included in a filter section. While FIG. 2 shows filter sections and optical channels having square shapes, each filter section and/or optical channel may have any other type of shape, such as a rectangle, an oval, a circle, a pentagon, a hexagon, another type of polygon, an irregular shape, and/or the like.

The multispectral filter 210 may be disposed on an array of sensor elements (e.g., the array of sensor elements 140). For example, a face of the multispectral filter 210 may be attached to a face of the array of sensor elements such that the multispectral filter 210 and the array of sensor elements are coextensive. Additionally, or alternatively, the multispectral filter 210 may be disposed on the array of sensor elements such that the one or more optical channels 230 respectively correspond to one or more sets of pixels, of a plurality of pixels, included in the array of sensor elements.

In some implementations, each optical channel of a filter section may be configured to pass light of a particular spectral range to a corresponding set of pixels of the array of sensor elements. For example, each optical channel may include a bandpass filter associated with a particular spectral range to pass bandpass filtered light associated with the particular spectral range to a corresponding set of pixels of the array of sensor elements.

In some implementations, a respective optical channel of each filter section, of the plurality of filter sections 220, may be configured to pass light of the same particular spectral range. For example, as shown in FIG. 2, optical channel 230-1-A of filter section 220-1, optical channel 230-2-A of filter section 220-2, optical channel 230-3-A of filter section 220-3, and optical channel 230-4-A of filter section 220-4 may each be configured to pass light of the same particular spectral range (e.g., optical channel 230-1-A, optical channel 230-2-A, optical channel 230-3-A, and optical channel 230-4-A may correspond to each other). While FIG. 2 shows optical channel 230-1-A, optical channel 230-2-A, optical channel 230-3-A, and optical channel 230-4-A having the same relative position (e.g., an upper left position) within filter section 220-1, filter section 220-2, filter section 220-3, and filter section 220-4, contemplated implementations include corresponding optical channels having the same or different relative positions within respective filter sections.

In some implementations, each filter section, of the plurality of filter sections 220, may be associated with a particular transmission percentage of light (e.g., a percentage amount of light that passes through an optical channel of the filter section). For example, as indicated by the different amounts of shading in FIG. 2, filter section 220-1, which has no shading, may be associated with a high transmission percentage (e.g., greater than 90% and less than or equal to 100%); filter section 220-2, which has a small amount of shading, may be associated with a moderately high transmission percentage (e.g., greater than 80% and less than or equal to 90%); filter section 220-3, which has a moderate amount of shading, may be associated with a moderately low transmission percentage (e.g., greater than 70% and less than or equal to 80%); and filter section 220-4, which has a large amount of shading, may be associated with a low transmission percentage (e.g., greater than 0% and less than or equal to 70%).

In some implementations, an optical density coating (e.g., comprising one or more optical thin films) associated with a transmission percentage may be formed, applied, and/or the like to a face of a filter section to ensure that each optical channel of the filter section is configured to pass the transmission percentage of light. For example, an optical density coating associated with a high transmission percentage may be disposed on filter section 220-1 (e.g., disposed on all of filter section 220-1 or at least a portion of filter section 220-1 that includes the optical channels 230-1); an optical density coating associated with a moderately high transmission percentage may be disposed on filter section 220-2 (e.g., disposed on all of filter section 220-2 or at least a portion of filter section 220-2 that includes the optical channels 230-2); an optical density coating associated with a moderately low transmission percentage may be disposed on filter section 220-3 (e.g., disposed on all of filter section 220-3 or at least a portion of filter section 220-3 that includes the optical channels 230-3); and/or an optical density coating associated with a low transmission percentage may be disposed on filter section 220-4 (e.g., disposed on all of filter section 220-4 or at least a portion of filter section 220-4 that includes the optical channels 230-4).

Additionally, or alternatively, each optical channel of a filter section may include the same optical density coating associated with a transmission percentage to ensure that each optical channel of the filter section is configured to pass the transmission percentage of light. For example, each optical channel, of the optical channels 230-1, may include an optical density coating associated with a high transmission percentage; each optical channel, of the optical channels 230-2, may include an optical density coating associated with a moderately high transmission percentage; each optical channel, of the optical channels 230-3, may include an optical density coating associated with a moderately low transmission percentage; and/or each optical channel, of the optical channels 230-4, may include an optical density coating associated with a low transmission percentage.

Accordingly, each optical channel of the optical channels 230-1 of filter section 220-1 may be configured to pass a high transmission percentage of light; each optical channel of the optical channels 230-2 of filter section 220-2 may be configured to pass a moderately high transmission percentage of light; each optical channel of the optical channels 230-3 of filter section 220-3 may be configured to pass a moderately low transmission percentage of light; and/or each optical channel of the optical channels 230-4 of filter section 220-4 may be configured to pass a low transmission percentage of light.

In an additional example, as shown in FIG. 2, optical channel 230-1-A of filter section 220-1 may be configured to pass a first transmission percentage (e.g., a high transmission percentage) of light of a particular spectral range to a first set of pixels of the array of sensor elements; optical channel 230-2-A of filter section 220-2 may be configured to pass a second transmission percentage (e.g., a moderately high transmission percentage) of light of the particular spectral range to a second set of pixels of the array of sensor elements; optical channel 230-3-A of filter section 220-3 may be configured to pass a third transmission percentage (e.g., a moderately low transmission percentage) of light of the particular spectral range to a third set of pixels of the array of sensor elements; and/or optical channel 230-4-A of filter section 220-4 may be configured to pass a fourth transmission percentage (e.g., a low transmission percentage) of light of the particular spectral range to a fourth set of pixels of the array of sensor elements.

As indicated above, FIG. 2 is provided merely as an example. Other examples may differ from what is described with regard to FIG. 2.

Figure 3:
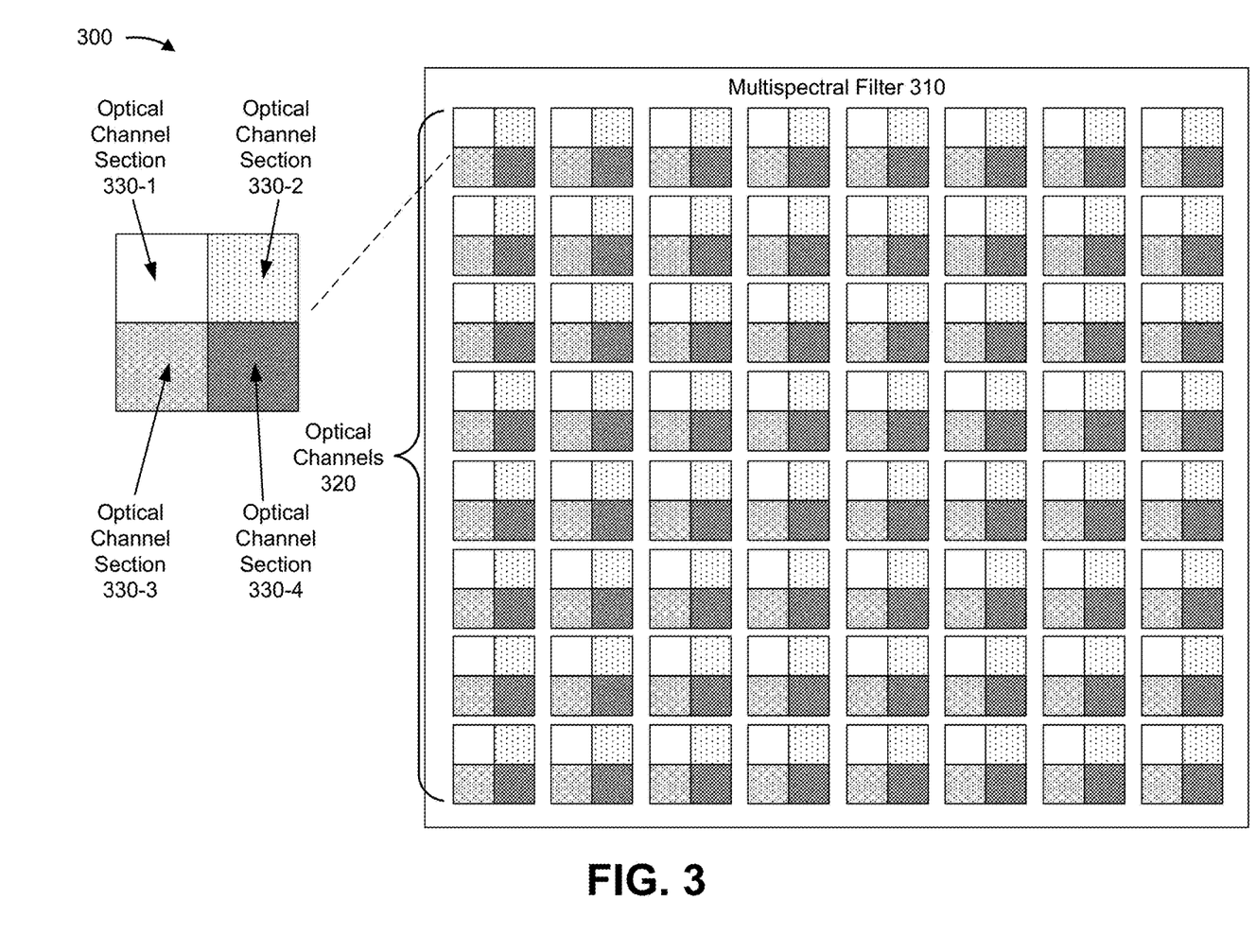

FIG. 3 is a diagram of an example implementation 300 described herein. As shown in FIG. 3, example implementation 300 includes a multispectral filter 310. The multispectral filter 310 may include one or more optical channels 320. As shown in FIG. 3, the multispectral filter 310 may include 64 optical channels 320, but contemplated implementations include any number of optical channels included in the multispectral filter 310. Each optical channel, of the one or more optical channels 320, may include a plurality of optical channel sections 330. As shown in FIG. 3, an optical channel may include optical channel sections 330-1 through 330-4, but contemplated implementations include any number of optical channel sections 330. While FIG. 3 shows the one or more optical channels 320 and the plurality of optical channel sections 330 having square shapes, each optical channel and/or optical channel section may have any other type of shape, such as a rectangle, an oval, a circle, a pentagon, a hexagon, another type of polygon, an irregular shape, and/or the like.

In some implementations, the multispectral filter 310 may be disposed on an array of sensor elements (e.g., the array of sensor elements 140). For example, a face of the multispectral filter 310 may be attached to a face of the array of sensor elements such that the multispectral filter 310 and the array of sensor elements are coextensive. Additionally, or alternatively, the multispectral filter 310 may be disposed on the array of sensor elements such that the one or more optical channels 320 and/or the plurality of optical channel sections 330 respectively correspond to one or more sets of pixels of the array of sensor elements.

In some implementations, each optical channel, of the one or more optical channels 320, may be configured to pass light of a particular spectral range to a corresponding set of pixels of the array of sensor elements. For example, each optical channel may include a bandpass filter associated with a particular spectral range to pass bandpass filtered light associated with the particular spectral range to a corresponding set of pixels of the array of sensor elements.

In some implementations, each optical channel section, of the plurality of optical channel sections 330 of an optical channel, may be associated with a particular transmission percentage (e.g., a percentage amount of light that passes through an optical channel section of the optical channel). For example, as indicated by the amount of shading in FIG. 3, optical channel section 330-1, which has no shading, may be associated with a high transmission percentage (e.g., greater than 90% and less than or equal to 100%); optical channel section 330-2, which has a small amount of shading, may be associated with a moderately high transmission percentage (e.g., greater than 80% and less than or equal to 90%); optical channel section 330-3, which has a moderate amount of shading, may be associated with a moderately low transmission percentage (e.g., greater than 70% and less than or equal to 80%), and optical channel section 330-4, which has a large amount of shading, may be associated with a low transmission percentage (e.g., greater than 0% and less than or equal to 70%). In some implementations, a respective optical density coating (e.g., comprising one or more optical thin films) associated with a transmission percentage may be formed on, applied to, disposed on, included in and/or the like each optical channel section of an optical channel to enable each optical channel section to pass the associated transmission percentage of light. Accordingly, the optical channel section 330-1 may be configured to pass a high transmission percentage of light; the optical channel section 330-2 may be configured to pass a moderately high transmission percentage of light; the optical channel section 330-3 may be configured to pass a moderately low transmission percentage of light; and/or the optical channel section 330-4 may be configured to pass a low transmission percentage of light.

As another example, as shown in FIG. 3, optical channel section 330-1 of an optical channel may be configured to pass a first transmission percentage (e.g., a high transmission percentage) of light of a particular spectral range to a first set of pixels of the array of sensor elements; optical channel section 330-2 of the optical channel may be configured to pass a second transmission percentage (e.g., a moderately high transmission percentage) of light of the particular spectral range to a second set of pixels of the array of sensor elements; optical channel section 330-3 of the optical channel may be configured to pass a third transmission percentage (e.g., a moderately low transmission percentage) of light of the particular spectral range to a third set of pixels of the array of sensor elements; and/or optical channel section 330-4 of the optical channel may be configured to pass a fourth transmission percentage (e.g., a low transmission percentage) of light of the particular spectral range to a fourth set of pixels of the array of sensor elements.

As indicated above, FIG. 3 is provided merely as an example. Other examples may differ from what is described with regard to FIG. 3.

Figure 4:
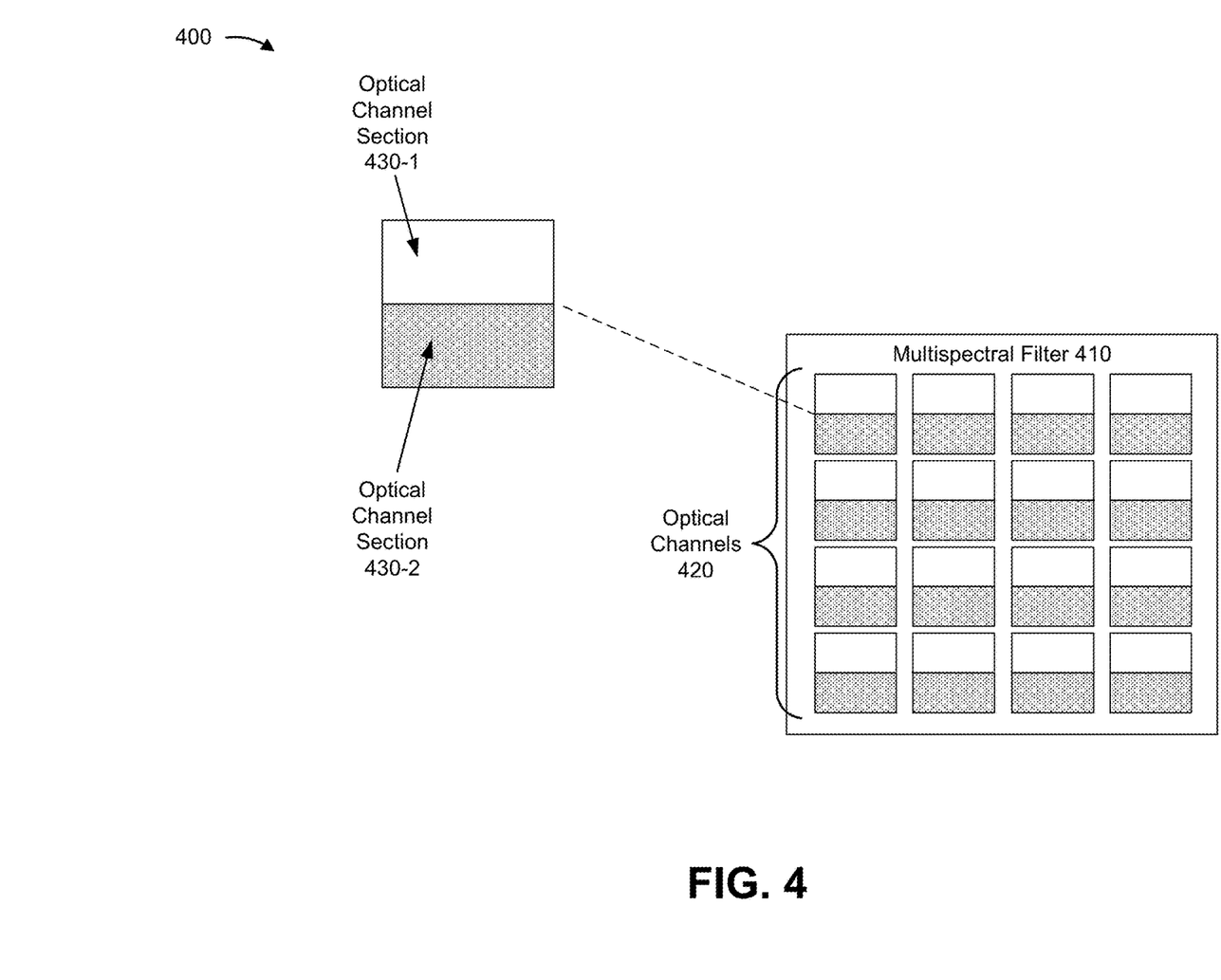

FIG. 4 is a diagram of an example implementation 400 described herein. As shown in FIG. 4, example implementation 400 includes a multispectral filter 410. The multispectral filter 410 may include one or more optical channels 420. As shown in FIG. 4, the multispectral filter 410 may include 16 optical channels 420, but contemplated implementations include any number of optical channels included in the multispectral filter 410. Each optical channel, of the one or more optical channels 420, may include a plurality of optical channel sections 430. As shown in FIG. 4, an optical channel may include optical channel sections 430-1 and 430-2, but contemplated implementations include any number of optical channel sections 430. While FIG. 4 shows the one or more optical channels 420 and the plurality of optical channel sections 430 having square shapes and rectangle shapes, each optical channel and/or optical channel section may have any other type of shape, such as an oval, a circle, a pentagon, a hexagon, another type of polygon, an irregular shape, and/or the like.

In some implementations, the multispectral filter 410 may be disposed on a portion of an array of sensor elements (e.g., the array of sensor elements 140). For example, a face of the multispectral filter 410 may be attached to a face of the array of sensor elements such that the multispectral filter 410 covers a portion of the array of sensor elements. Additionally, or alternatively, the multispectral filter 410 may be disposed on the array of sensor elements such that the one or more optical channels 420 respectively correspond to one or more sets of pixels of the array of sensor elements and/or that the plurality of optical channel sections 430 respectively correspond to a plurality of subsets of pixels of the array of sensor elements. In some implementations, the multispectral filter 410 may be disposed on a portion of the array of sensor elements such that one or more other optical filters (e.g., that are similar to the multispectral filter 410) may also be disposed on the array of sensor elements. For example, four multispectral filters 410 may be disposed on the array of sensor elements, such that each multispectral filter 410 acts similar to a filter section as described herein in relation to FIG. 2.

In some implementations, each optical channel, of the one or more optical channels 420, may be configured to pass light of a particular spectral range to a corresponding set of pixels of the array of sensor elements. For example, each optical channel may include a bandpass filter associated with a particular spectral range to pass bandpass filtered light associated with the particular spectral range to a corresponding set of pixels of the array of sensor elements.

In some implementations, each optical channel section, of the plurality of optical channel sections 430 of an optical channel, may be associated with a particular transmission percentage (e.g., a percentage amount of light that passes through an optical channel section of the optical channel). For example, as indicated by the shading in FIG. 4, optical channel section 430-1, which has no shading, may be associated with a high transmission percentage (e.g., greater than 50% and less than or equal to 100%) and optical channel section 430-2, which has shading, may be associated with a low transmission percentage (e.g., greater than 0% and less than or equal to 50%). In some implementations, a respective optical density coating (e.g., comprising one or more optical thin films) associated with a transmission percentage may be formed on, applied to, disposed on, included in and/or the like each optical channel section of an optical channel to enable each optical section to pass the associated transmission percentage of light. Accordingly, the optical channel section 430-1 may be configured to pass a high transmission percentage of light and the optical channel section 430-2 may be configured to pass a low transmission percentage of light.

As another example, as shown in FIG. 4, optical channel section 430-1 of an optical channel may be configured to pass a first transmission percentage (e.g., a high transmission percentage) of light of a particular spectral range to a first set of pixels of the array of sensor elements and optical channel section 430-2 of the optical channel may be configured to pass a second transmission percentage (e.g., a low transmission percentage) of light of the particular spectral range to a second set of pixels of the array of sensor elements.

As indicated above, FIG. 4 is provided merely as an example. Other examples may differ from what is described with regard to FIG. 4.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical device comprising:
an array of sensor elements that includes a plurality of pixels; and
a multispectral filter disposed on the array of sensor elements, configured to:
pass a first transmission percentage of light of a particular spectral range to a first set of pixels of the plurality of pixels; and
pass a second transmission percentage of light of the particular spectral range to a second set of pixels of the plurality of pixels,
wherein the first transmission percentage is greater than 0%,
wherein the second transmission percentage is greater than 0%, and
wherein the second transmission percentage is different from the first transmission percentage.

2. The optical device of claim 1, wherein the multispectral filter includes an array of optical channels,
wherein a first optical channel, of the array of optical channels, is configured to pass the first transmission percentage of light of the particular spectral range to the first set of pixels,
wherein the first optical channel includes a first bandpass filter associated with the particular spectral range and an optical density coating associated with the first transmission percentage; and
wherein a second optical channel, of the array of optical channels, is configured to pass the second transmission percentage of light of the particular spectral range to the second set of pixels,
wherein the second optical channel includes a second bandpass filter associated with the particular spectral range and an optical density coating associated with the second transmission percentage.

3. The optical device of claim 1, wherein the multispectral filter includes a first filter section associated with the first transmission percentage and a second filter section associated with the second transmission percentage,
wherein an optical channel of the first filter section is configured to pass the first transmission percentage of light of the particular spectral range to the first set of pixels; and
wherein an optical channel of the second filter section is configured to pass the second transmission percentage of light of the particular spectral range to the second set of pixels.

4. The optical device of claim 3, wherein an optical density coating associated with the first transmission percentage is disposed on at least a portion of the first filter section that includes the optical channel of the first filter section, and
wherein an optical density coating associated with the second transmission percentage is disposed on at least a portion of the second filter section that includes the optical channel of the second filter section.

5. The optical device of claim 1, wherein the multispectral filter includes an array of optical channels,
wherein an optical channel of the multispectral filter is configured to pass light of the particular spectral range,
wherein a first section of the optical channel is configured to pass the first transmission percentage of light of the particular spectral range to the first set of pixels, and
wherein a second section of the optical channel is configured to pass the second transmission percentage of light of the particular spectral range to the second set of pixels.

6. The optical device of claim 5, wherein:
the first section of the optical channel includes a first optical density coating associated with the first transmission percentage; and
the second section of the optical channel includes a second optical density coating associated with the second transmission percentage.

7. The optical device of claim 1, wherein the multispectral filter includes an array of optical channels,
wherein each optical channel includes a plurality of optical channel sections configured to pass respective transmission percentages of light,
wherein a first section of a particular optical channel is configured to pass the first transmission percentage of light of the particular spectral range to the first set of pixels, and
wherein a second section of the particular optical channel is configured to pass the second transmission percentage of light of the particular spectral range to the second set of pixels.

8. A system, comprising:
an array of sensor elements; and
a multispectral filter comprising a plurality of optical channels that is disposed on at least a portion of the array of sensor elements, configured to:
pass a first transmission percentage of bandpass filtered light associated with a particular spectral range to the array of sensor elements; and
pass a second transmission percentage of bandpass filtered light associated with the particular spectral range to the array of sensor elements,
wherein the first transmission percentage is greater than 0%,
wherein the second transmission percentage is greater than 0%, and
wherein the second transmission percentage is different from the first transmission percentage.

9. The system of claim 8, wherein:
a first optical channel, of the plurality of optical channels, is configured to pass the first transmission percentage of bandpass filtered light associated with the particular spectral range to the array of sensor elements,
wherein the first optical channel is part of a filter section of the multispectral filter associated with the first transmission percentage; and
a second optical channel, of the plurality of optical channels, is configured to pass the second transmission percentage of bandpass filtered light associated with the particular spectral range to the array of sensor elements,
wherein the second optical channel is part of a filter section of the multispectral filter associated with the second transmission percentage.

10. The system of claim 9, wherein the first optical channel includes a first bandpass filter associated with the particular spectral range and an optical density coating associated with the first transmission percentage, and
wherein the second optical channel includes a second bandpass filter associated with the particular spectral range and an optical density coating associated with the second transmission percentage.

11. The system of claim 8, wherein the multispectral filter comprises a plurality of filter sections and a respective set of optical channels, of the plurality of optical channels, is included in each filter section,
wherein an optical channel, of a set of optical channels associated with a first filter section, of the plurality of filter sections, is configured to pass the first transmission percentage of bandpass filtered light associated with the particular spectral range to the array of sensor elements; and
wherein an optical channel, of a set of optical channels associated with a second filter section, of the plurality of filter sections, is configured to pass the second transmission percentage of bandpass filtered light associated with the particular spectral range to the array of sensor elements.

12. The system of claim 8, wherein each optical channel, of the plurality of optical channels, includes a plurality of optical channel sections,
wherein a first section of a particular optical channel, of the plurality of optical channels, is configured to pass the first transmission percentage of bandpass filtered light associated with the particular spectral range to the array of sensor elements, and
wherein a second section of the particular optical channel is configured to pass the second transmission percentage of bandpass filtered light associated with the particular spectral range to the array of sensor elements.

13. The system of claim 12, wherein the first section of the particular optical channel includes an optical density coating configured to allow the first transmission percentage of bandpass filtered light to pass, and
wherein the second section of the particular optical channel includes an optical density coating configured to allow the second transmission percentage of bandpass filtered light to pass.

14. The system of claim 8, wherein a particular optical channel, of the plurality of optical channels, is configured to pass the first transmission percentage of bandpass filtered light associated with the particular spectral range to the array of sensor elements and the second transmission percentage of bandpass filtered light associated with the particular spectral range to the array of sensor elements at the same time.

15. A multispectral filter comprising:
a plurality of optical channels,
wherein one or more optical channels, of the plurality of optical channels, are configured to:
pass a first transmission percentage of light associated with a particular spectral range to a first set of pixels of a multispectral sensor device; and
pass a second transmission percentage of light associated with the particular spectral range to a second set of pixels of the multispectral sensor device,
wherein the first transmission percentage is greater than 0%,
wherein the second transmission percentage is greater than 0%, and
wherein the second transmission percentage is different from the first transmission percentage.

16. The multispectral filter of claim 15, wherein the one or more optical channels include a first optical channel that includes an optical density coating associated with the first transmission percentage and a second optical channel that includes an optical density coating associated with the second transmission percentage,
wherein the first optical channel and the second optical channel each include a respective bandpass filter configured to pass light of the particular spectral range.

17. The multispectral filter of claim 16, wherein the first optical channel is associated with a first filter section of the multispectral filter that includes one or more additional optical channels that are each configured to pass a first transmission percentage of light associated with a different spectral range, and
wherein the second optical channel is associated with a second filter section of the multispectral filter that includes one or more additional optical channels that are each configured to pass a second transmission percentage of light associated with a different spectral range.

18. The multispectral filter of claim 15, wherein the one or more optical channels include a particular optical channel that includes a plurality of optical channel sections,
wherein a first optical channel section of the particular optical channel includes a first bandpass filter associated with the particular spectral range and an optical density coating associated with the first transmission percentage; and
wherein a second optical channel section of the particular optical channel includes a second bandpass filter associated with the particular spectral range and an optical density coating associated with the second transmission percentage.

19. The multispectral filter of claim 15, wherein a particular optical channel of the one or more optical channels is configured to pass the first transmission percentage of light associated with the particular spectral range via a first optical channel section of the particular optical channel, and
wherein the particular optical channel is configured to pass the second transmission percentage of light associated with the particular spectral range via a second optical channel section of the particular optical channel.

20. The multispectral filter of claim 19, wherein an optical density coating associated with the first transmission percentage is disposed on the first optical channel section of the particular optical channel, and wherein an optical density coating associated with the second transmission percentage is disposed on the second optical channel section of the particular optical channel.

* * * * *